United States Patent [19]

Zychowski et al.

[11] 4,450,251

[45] May 22, 1984

[54] THERMOSETTING AQUEOUS VARNISH COMPOSITIONS

[75] Inventors: Edwin A. Zychowski, Des Plaines; Ronald L. Richards, Oak Park, both of Ill.

[73] Assignee: DeSoto, Inc., Des Plaines, Ill.

[21] Appl. No.: 473,546

[22] Filed: Mar. 9, 1983

[51] Int. Cl.$^3$ ................................................. C08K 5/18
[52] U.S. Cl. .................................... 524/251; 524/253; 524/257; 524/558; 524/510; 524/512
[58] Field of Search ............... 524/251, 253, 257, 558, 524/510, 512

[56] References Cited

U.S. PATENT DOCUMENTS 3,208,963  9/1965  Jasinski .................................. 524/558
4,098,746  7/1978  Becker et al. ......................... 524/512

Primary Examiner—Paul R. Michl
Assistant Examiner—Alex H. Walker

Attorney, Agent, or Firm—Dressler, Goldsmith, Shore, Sutker & Milnamow, Ltd.

[57] ABSTRACT

Aqueous thermosetting varnish compositions that are particularly water resistant after curing are disclosed. These compositions contain by weight (A) about 20–40 percent of a solution copolymer polymerized from monomers consisting essentially of (a) about 50–75 percent vinyl ester of a $C_1$–$C_3$ carboxylic acid, (b) about 10–45 percent of $C_1$–$C_8$ alkyl acrylate or methacrylate ester and (c) about 5–15 percent of a mixture of (i) at least about 0.5 percent monoethylenically unsaturated $C_3$–$C_5$ carboxylic acid and (ii) at least about 2 percent $C_2$–$C_4$ hydroxyalkyl acrylate or methacrylate. The copolymer is polymerized at a temperature of at least 110° C. and at a non-volatile solids content of 60–80 percent. Also present in the varnish are (B) about 35–55 percent water, (C) about 7–15 percent water-miscible organic solvent, (D) about 7–15 percent cross-linking agent, and (E) an amount of a volatile amine sufficient to disperse the copolymer in the vehicle provided by the water and water miscible organic solvent.

8 Claims, No Drawings

THERMOSETTING AQUEOUS VARNISH COMPOSITIONS

DESCRIPTION

1. Technical Field

This invention relates to thermosetting aqueous varnish compositions that are intended primarily for application to metal substrates which are in contact with water subsequent to curing of the varnish coating.

2. Background Art

Thermosetting carboxyl-functional acrylic copolymers are known to provide hard, flexible and glossy water-resisting finishes from aqueous compositions. However, acrylic monomers are expensive, and it is therefore desirable to minimize their use. It is also known that vinyl acetate may be included in the acrylic copolymers. However, when this is done to an extent of more than about half of the weight of copolymer, to obtain the benefit of such a low cost monomer, the water-resisting properties of the copolymer so produced become less satisfactory. Water-resisting characteristics such as blush-resistance are especially important in varnish coatings that are used on metallic cans, such as those made of aluminum and steel, in the food industry.

A primary benefit of the present invention is that the low cost attributes of the use of about 50 weight percent or more of vinyl acetate in an aqueous varnish composition can be obtained while also maintaining the blush-resistance of the cured coating on its metallic substrate.

3. Disclosure of the Invention

In accordance with this invention, it has been found that blush-resistant coatings can be prepared from a thermosetting coating composition that comprises a substantially stable dispersion of about 20 to about 40 weight percent of a carboxyl-functional copolymer, about 35 to about 55 weight percent water, about 7 to about 15 weight percent of a water-miscible organic solvent, a cross-linking agent and a sufficient amount of a volatile amine base to form a salt with the carboxyl groups of the copolymer and disperse the copolymer in the aqueous vehicle provided by the water and water-miscible organic solvent. The coating composition may be applied as a wet film on the metallic substrate, and then cured on the substrate at elevated temperatures to provide a hard, flexible and glossy, blush-resistant coating for the metallic substrate.

The copolymer useful herein is a specifically polymerized solution copolymer that is formed by the polymerization of three groups of monoethylenically unsaturated monomers that consist esssentially of (a) about 50 to about 75 weight percent vinyl acetate, (b) about 10 to about 45 weight percent of a $C_1$-$C_8$ alkyl acrylate or methacrylate ester and (c) about 5 to about 15 weight percent of a mixture containing (i) at least about 2 weight percent $C_2$-$C_4$ hydroxyalkyl acrylate or methacrylate and (ii) at least about 0.5 weight percent monoethylenically unsaturated $C_3$-$C_5$ carboxylic acid. The solution copolymer is polymerized at a temperature of at least about 110° C. at a solids content of about 65 to about 80 percent, and has a calculated glass transition temperature of about −10° to about +15° C.

In more preferred practice, the vinyl acetate is present at about 65 to about 75 weight percent of the copolymer while the $C_1$-$C_8$ alkyl acrylate or methacrylate ester is present at about 20 to about 25 weight percent.

Butyl acrylate is a preferred monomer, and is used illustratively herein as exemplary of a $C_1$-$C_8$ alkyl acrylate or methacrylate. Additional monomers of this group include ethyl acrylate, hexyl methacrylate, and 2-ethylhexyl acrylate.

The alkyl acrylate or methacrylate ester assists in providing a desirable glass transition temperature, $T_g$, to the solution copolymer. calculated $T_g$ values for the solution copolymer are preferably about −10° to about +15° C., and are more preferably about −5° to about +10° C. so that a dried, uncured coating is substantially tack-free. $T_g$ values are calculated for the copolymer based upon monomer identities and quantities by well-known methods.

The third component of the copolymer is a mixture of monomers that constitute about 5 to about 15 weight percent of the copolymer. The mixture includes at least about 0.5 weight percent monoethylenically unsaturated carboxylic acid, and at least about 2 weight percent $C_2$-$C_4$ hydroxyalkyl acrylate or methacrylate. More preferably, the mixture contains at least about 4 weight percent of the hydroxyalkyl ester and at least about 6 weight percent of the unsaturated carboxylic acid, which proportions assist in providing good aqueous varnish stability and a cured coating having optimal properties.

Exemplary monoethylenically unsaturated $C_3$-$C_5$ carboxylic acid monomers include acrylic acid, methacrylic acid, crotonic acid and maleic acid or anhydride. Maleic anhydride is not itself an acid, but provides acid functionality to the copolymer of the coating composition either during the polymerization step at which time the anhydride may react to form a half-ester with the copolymerization solvent, or thereafter when the copolymer is dispersed in water. As a consequence of its carboxylic acid-producing characteristic, maleic anhydride is included herein as an acid monomer. Acrylic acid or methacrylic acid are the preferred monoethylenically unsaturated $C_3$-$C_5$ carboxylic acids.

Exemplary $C_2$-$C_4$ hydroxyalkyl acrylate or methacrylate monomers are 2-hydroxyethyl acrylate, and 2-hydroxypropyl methacrylate. 2-Hydroxyethyl acrylate is preferred since it provides a primary hydroxyl group for cure.

The copolymers of the present invention are prepared in an unusual manner for such materials. These copolymers are polymerized (i) in solution, (ii) at higher than usual temperatures, and (iii) at solids levels that are greater than those normally utilized for such materials. In addition, the copolymers useful herein are preferably polymerized (iv) in the absence of the conventional mercaptan chain-terminating agent. These four factors, inter alia, are thought to be responsible in large part for the unique, low viscosity, high solids, and roll coatable aqueous varnishes of this invention and the blush-resistant, glossy cured coatings prepared from them. The same monomers copolymerized, applied and cured in the same way, but using conventional solution polymerization techniques do not provide blush-resistant coatings.

The copolymers of this invention are polymerized at a temperature of at least about 110° C. and more preferably at a temperature of about 125° C. On the other hand, it is more usual to form copolymers from monomers similar to those useful herein at temperatures between about 80° and about 100° C.

This polymerization at elevated temperatures is carried out at a non-volatile solids content of about 65 to about 80 percent by weight, and more preferably at about 70 to about 75 percent by weight, of the total polymerization reaction composition. Conventional non-volatile solids contents for such monomers during polymerization are about 50 to about 60 weight percent.

The solvent used during polymerization is preferably a volatile, water-miscible, hydroxyl-functional solvent whose boiling point is at least about 110°, and preferably higher. Exemplary of such of such solvents are 2-butoxyethanol, 3-ethoxypropanol and 2-ethoxyethanol. 2-Butoxyethanol is a preferred solvent.

Water-immiscible solvents such as toluene or xylene can be utilized as the solvent for copolymerization. However, inasmuch as the copolymers are ultimately utilized in aqueous dispersions, the use of such solvents is desirably minimized. A lower boiling solvent that is water-miscible or water-immiscible such as acetone or benzene can also be utilized as the solvent for copolymerization, but copolymerizations utilizing such solvents must be carried out at greater than atmospheric pressure to obtain the desired reaction temperature, and those solvents are also not preferred.

The aqueous, thermosetting varnishes of this invention contain a water-miscible organic solvent having a boiling point below the temperature at which the coatings are cured as part of the vehicle in which the copolymers are dispersed. It is preferred that the solvent utilized in copolymerizing the before-mentioned monomers comprise at least a portion of the water-miscible organic solvent of the varnish. Additional amounts of that solvent or another solvent can be added to provide the desired amount of water-miscible organic solvent. The total amount of water-miscible organic solvent present in the thermosetting varnish is about 7 to about 15 weight percent of the aqueous varnish composition.

The water-miscible organic solvent is preferably present in an amount of about 7 to about 10 weight percent of the aqueous varnish when the varnish composition also contains a water-soluble polyol (discussed hereinafter) that assists in dissolving one or more components of the varnish. In the absence of such a polyol, the water-miscible organic solvent is preferably present at about 10 to about 15 weight percent.

It is noted in discussing the content of copolymer in the thermosetting varnish composition, that that content is recited as non-volatile solids and does not include any of the solvent used in preparing that copolymer. The amount of water-miscible organic solvent in the thermosetting varnish includes the solvent used during copolymerization when that solvent is water-miscible and has been carried over, as by dilution, into the thermosetting varnish.

The copolymerization reaction is itself otherwise conventional. It is conveniently carried out either at reflux with an appropriate solvent or which means as are known in the art for maintaining the desired constant temperature in the reaction vessel in the presence of a free radical polymerization catalyst. Exemplary catalysts include benzoyl peroxide, di-t-butyl peroxide and t-butyl perbenzoate. An exemplary copolymerization is illustrated hereinafter.

The thermosetting varnishes of this invention also include about 7 to about 15 weight percent of a conventional cross-linking agent which is preferably an aminoplast or phenoplast. The preferred aminoplast or phenoplast cross-linking agent is a polymethylol-functional material which is preferably used in etherified form as a polyalkoxymethyl derivative containing at least about three alkoxymethyl groups. Hexamethoxymethyl melamine is exemplary of a material that is useful for cross-linking copolymers containing moderate to relatively high amounts of unsaturated carboxylic acid and/or hydroxyalkyl acrylate or methacrylate. Trimethoxymethyl melamine is preferred for use when the concentration of carboxylic acid monomer is relatively low. An exemplarly phenoplast cross-linking agent is an A-stage phenol-formaldehyde resol. Blocked polyisocyanates are also useful cross-linking agents and are exemplified by the adduct formed from two moles of methanol and one mole of tolylene-2,4-diisocyanate. Aminoplast cross-linking agents are particularly preferred.

Any volatile monohydric alcohol may be used to provide the alkoxy portion of the alkoxymethyl group of the cross-linking agent. Methyl and/or ethyl alcohols are the preferred etherifying alcohols, especially methanol.

The thermosetting varnishes of this invention can conveniently be prepared directly in the reaction vessel in which the solution copolymer was prepared. Thus, after the copolymerization reaction has been completed, the contents of the reaction vessel are cooled to a temperature below about 100° C. and preferably to about 80° C. A mixture of a volatile amine such as N,N-dimethylethanolamine or the like and water are added to the dissolved polymer.

A sufficient amount of volatile amine is utilized to disperse the copolymer in the water-miscible organic solvent-water vehicle so formed. The selection of amines and their use are well known for this purpose. The amount of volatile amine utilized depends primarily upon the concentration of carboxylic acid functionality in the copolymer. The amount of volatile amine used is typically sufficient to neutralize about 30 to about 100 percent or more of the copolymer carboxylic acid groups present, and typically provides about 1 to about 4 percent by weight of the total varnish. The volatile amine used is preferably a tertiary amine, as is known. The solution copolymer so dispersed in the aqueous vehicle provides a dispersed composition that is substantially stable on storage.

The terms "volatile amine" and "volatile monohydric alcohol" are used herein to mean an amine and an alcohol, respectively, whose boiling points are each below the temperature at which the thermosetting varnish is baked so that the amine and alcohol are removed from the coated substrate either before or during baking. The use of volatile amines for dispersing carboxylic acid-containing copolymers in aqueous vehicles and also the use of volatile alcohols to block the methylol groups of the curing agent followed by vaporization of these volatiles during cure at elevated temperatures are well known in the art.

Aqueous thermosetting varnish compositions of this invention may also include up to about 8 weight percent of a water-dispersible or water-soluble polyol that does not vaporize under curing conditions. The propylene oxide-bisphenol A adduct containing an average of about six polymerized propylene oxide units per molecule and available under the trademark SYN FAC 8008 by Milliken & Co., Inman, S.C. is illustrative of one group of such polyols. Other exemplary polyols include $C_2$–$C_4$ alkylene oxide adducts of low molecular weight polyols which themselves contain 2 to about 4 hydroxy groups. The low molecular weight polyols are illustrated by materials such as ethylene glycol, trimethylol ethane and pentaerythritol. The relatively non-volatile polyols prepared from the low molecular weight polyols are illustrated by the propylene oxide-trimethylol propane adduct containing an average of about one to about two polymerized propylene oxide units sold under the trademark PLUROCOL TP440 by BASF Wyandotte Corp., Parisppany, N.J.

The above polyols provide additional sites for cross-linking during cure and also assist in providing flexibility to the cured coating. The non-volatile polyol also provides a means for lowering the content of volatile ingredients in the aqueous varnish.

The water-dispersible or water-soluble polyol is considered to be a separate ingredient of the varnish composition even though it may be water-soluble and have solvent-like properties. The reason for such consideration is that substantially all of the non-volatile polyol remains cross-linked in the cured coating while substantially all of the water-miscible organic solvent is removed when cure of the varnish has been effected.

The cross-linking agent and any additional ingredients may be added to the copolymer solution or to the aqueous dispersion containing the same. This final dispersion is also substantially stable, and it provides the desired thermosetting aqueous varnish. The term "substantially stable" is used herein to mean that the dispersion does not settle or form separate phases on standing for at least about seven days at room temperature.

The aqueous varnish so prepared typically has a nonvolatile solids content of about 35 to about 60 weight percent and a viscosity using a #4 Ford cup of about 30 to about 50 seconds. Such concentrations of nonvolatile solids and viscosities permit easy application of the aqueous varnish, as by roll coating techniques.

In typical uses, the coating is applied in an amount to provide about 2 to about 5 milligrams (dry weight) per 4 square inches of substrate surface. The aqueous varnish may be applied directly to a metal surface or to a metal surface that has been previously printed upon.

The coatings of this invention are typically used on the outside of metal cans. When so used the coating is cured by baking at a peak metal temperature of about 350° F. to about 400° F. for a period of about 30 seconds to about 4 seconds, respectively. The coatings so cured are also able to withstand a second bake period which may be used to cure a coating on the inside of the metal can. Such second bake periods typically last for 30 to about 60 seconds at a peak metal temperature of about approximately 400° F. An oven temperature of approximately 475° F. can provide a peak metal temperature of about 365° F. for the initial cure.

The cured coatings of the aqueous varnishes of this invention are flexible and water resistant; i.e. they show substantially no blushing or loss of adhesion in a standardized test using an aqueous detergent solution as illustrated hereinafter. The cured coatings also provide good mobility, having coefficients of friction of approximately 0.05 to about 0.07, and exhibit good gloss values and have pencil hardness values of about H or greater. Coefficients of friction and gloss measurements are measured using standard techniques well known in the industry.

While the aqueous varnish compositions of this invention are typically utilized as substantially clear, unpigmented compositions, they may also be pigmented. A typically useful pigment is titanitum dioxide, rutile. Typical pigmentation involves a pigment to binder ratio of about 0.04:1 to about 1.5:1 and preferably about 0.6:1 to about 1.2:1.

The thermosetting, aqueous varnishes may also include minor amounts of conventional thermoset coating additivies, such as an acid catalyst to assist the cross-linking reaction, lubricant, defoamer, flow-wetting agent and the like.

The invention is illustrated in the Examples which follow.

EXAMPLE 1:

Solution Copolymer

A solution copolymer useful herein was prepared in a flask containing two dropping funnels, a thermometer, condenser and agitator. Heat was supplied by a heating mantle surrounding the bottom of the flask and the reaction temperature was controlled by standard means.

The dropping funnels contained solutions A and B, respectively, as shown below:

| COMPONENTS | PARTS BY WEIGHT |
|---|---|
| Solution A | |
| 2-Butoxyethanol | 23.5 |
| Vinyl acetate | 67.0 |
| Butyl acrylate | 21.2 |
| 2-Hydroxyethyl acrylate | 5.3 |
| Acrylic acid | 6.5 |
| Solution B | |
| 2-Butoxyethanol | 20.0 |
| Benzoyl peroxide | 0.5 |
| Di-t-butyl peroxide | 0.5 |
| t-Butyl perbenzoate | 0.5 |

Solutions A and B were added to the flask slowly and simultaneously with heating and agitation. Polymerization began at a reaction mixture temperature of about 110° C., with the temperature being maintained at about 110° C. to about 125° C. for the period of addition of monomers and catalyst. That addition period lasted about 4 hours.

The temperature of the polymerization reaction was raised to 150° C. after the additions were completed. The 150° C. temperature was maintained until substantially all of the monomers were converted to polymer, as measured by standard techniques. The solution copolymer so prepared contained about 68 weight percent nonvolatile solids.

EXAMPLE 2:

Aqueous Thermosetting Varnishes

Thermosetting substantially stable aqueous varnishes were prepared using the solution copolymer of Example 1. Three such varnishes are illustrated hereinbelow:

| | Parts by Weight | | |
|---|---|---|---|
| | Varnish 1 | Varnish 2 | Varnish 3 |
| Components | | | |
| Copolymer of Example 1[1] | 80 | 60 | 50 |
| Cross-linking agent[2] | 20 | 40 | 35 |
| Polyol[3] | — | — | 15 |
| Water-miscible organic solvent[4] | 34.3 | 25.7 | 21.4 |
| Volatile amine[5] | 7.0 | 5.3 | 4.4 |
| Water | 108.7 | 119.0 | 124.2 |
| | 250.0 | 250.0 | 250.0 |

-continued

|  | Parts by Weight | | |
|---|---|---|---|
|  | Varnish 1 | Varnish 2 | Varnish 3 |
| Additional Components[6] |  |  |  |
| Varnish Properties |  |  |  |
| Nonvolatile solids (%) | 40.0 | 40.0 | 40.0 |
| Viscosity (seconds) | — | 44 | 30 |

[1]The parts of the copolymer of Example 1 are given as the solids that copolymer provided to the varnish.
[2]Hexamethoxymethyl melamine was used.
[3]A dimer fatty alcohol sold under the trademark SYN FAC 8008 by Milliken & Co. of Inman, S.C. was used.
[4]2-Butoxyethanol was used and the amount listed includes the amount of that solvent originally present from the solution copolymer preparation.
[5]Dimethylethanolamine was used.
[6]Conventional, small amounts of acid catalyst for the cross-linker, lubricant, defoamer and flow-wetting agent were also added to the varnish.
[7]Viscosity was measured with a #4 Ford cup.

The above varnishes were prepared by admixing and agitating the solution copolymer at a temperature of about 90° C. with a mixture containing the amounts of volatile amine and water shown above. Additional amounts of butyl cellosolve were also added to provide the amount shown. The amount of volatile amine provided 100 percent neutralization for the calculated amount of polymeric carboxylic acid present. The admixtures so prepared were substantially stable.

The remaining ingredients were thereafter added with agitation to provide the substantially stable, thermosetting aqueous varnishes of this invention.

EXAMPLE 3:

Metal Coating

The varnishes of Example 3 were thereafter roll coated on aluminum sheets in an amount to provide a weighing about 3 milligrams per 4 square inches of metallic substrate when dry. The covered metallic substrates were then baked in an oven at a temperature of 475° F. for a period of 15 seconds to provide a peak metal temperature of about 365°F.

Each panel was immersed in an aqueous solution containing 1 weight percent of a commercially available detergent sold under the trademark JOY dishwashing liquid by Procter & Gamble, Cincinnati, Ohio. The aqueous solution was previously heated to a temperature of 180° F. and maintained at that temperature for a period of 10 minutes during which the cured, coated panel was immersed therein. The coated panels were thereafter removed from the solution and examined subjectively for the presence of any blush-containing areas, or regions where coating adhesion failed.

The coatings of Varnishes 1 and 2 showed no blushing in this test. The coating of Varnish 3 had some blush spots on less than about 5 percent of its surface. The blush spots disappeared within less than about 15 minutes and the varnish composition passed this rigorous test. No loss of adhesion was noted for any of the cured coatings.

The cured coatings had coefficients of friction of 0.05–0.07, and gloss values of about 90 when measured at 60° using ASTM gloss test D-523.

The foregoing is intended as illustrative of the present invention but not limiting. Numerous variations and modifications may be effected without departing from the true spirit and scope of the novel concepts of the invention. It is to be understood that no limitation with respect to the specific compositions and methods illustrated herein is intended or should be inferred. The invention is defined by the claims that follow.

We claim:
1. An aqueous thermosetting coating composition comprising a substantially stable dispersion including
   (A) about 20 to about 40 weight percent of a solution copolymer polymerized from monomers consisting essentially of (a) about 50 to about 75 weight percent vinyl acetate, (b) about 10 to about 45 weight percent of $C_1$–$C_8$ alkyl acrylate or methacrylate ester and (c) about 5 to about 15 weight percent of a mixture of (i) at least about 0.5 weight percent monoethylenically unsaturated $C_3$–$C_5$ carboxylic acid and (ii) at least about 2 weight percent $C_2$–$C_4$ hydroxyalkyl acrylate or methacrylate, wherein said copolymer has a calculated $T_g$ value of about $-10°$ to about $+15°$ C. and is polymerized at a temperature of at least about 110° C. at a non-volatile solids content of about 65 to about 80 percent;
   (B) about 35 to about 55 weight percent water;
   (C) about 7 to about 15 weight percent water-miscible organic solvent;
   (D) about 7 to about 15 weight percent cross-linking agent; and
   (E) an amount of volatile amine sufficient to disperse said copolymer in said water and said water-miscible organic solvent.
2. The coating composition according to claim 1 wherein said cross-linking agent is an aminoplast or a phenoplast.
3. The coating composition according to claim 1 wherein said vinyl acetate is present in said copolymer at about 65 to about 70 weight percent of said copolymer.
4. The coating composition according to claim 1 further including up to about 8 weight percent of a polyol that does not vaporize under curing conditions.
5. The coating composition according to claim 1 wherein said $C_1$–$C_8$ alkyl acrylate or methacrylate ester is butyl acrylate and is present in said copolymer at about 20 to about 25 weight percent.
6. The coating composition according to claim 1 wherein said monoethylenically unsaturated carboxylic acid is acrylic acid or methacrylic acid.
7. The coating composition according to claim 1 wherein said $C_2$–$C_4$ hydroxyalkyl acrylate or methacrylate is 2-hydroxyethyl acrylate.
8. An aqueous thermosetting coating composition comprising a substantially stable dispersion including
   (A) about 20 to about 40 weight percent of a solution copolymer polymerized from monomers consisting essentially of about 65 to about 70 weight percent vinyl acetate, (b) about 20 to about 25 weight percent butyl acrylate and about 10 to about 15 weight percent of a mixture of (i) acrylic acid or methacrylic acid and (ii) 2-hydroxyethyl acrylate, wherein said acrylic acid or methacrylic acid is present in at least about 6 weight percent and said 2-hydroxyethyl acrylate is present in at least about 4 weight percent, wherein said copolymer has a calculated $T_g$ value of about $-10°$ to about $+15°$ C. and is polymerized a temperature of at least about 110° C., at a non-volatile solids content of about 60 to about 80 percent and in the absence of a mercaptan chain-terminating agent;
   (B) about 35 to about 55 weight percent water;
   (C) about 7 to about 15 weight percent hydroxyl-functional water-miscible organic solvent;
   (D) about 7 to about 15 weight percent aminoplast cross-linking agent; and
   (E) and about 1 to about 4 weight percent of a volatile amine.

* * * * *